US008251786B2

(12) United States Patent
Gasser

(10) Patent No.: US 8,251,786 B2
(45) Date of Patent: Aug. 28, 2012

(54) PROTECTION DEVICE FOR VENTILATION DUCTS

(76) Inventor: Erwin Gasser, Belp (CH)

( * ) Notice: Subject to any disclaimer, the term of this patent is extended or adjusted under 35 U.S.C. 154(b) by 1034 days.

(21) Appl. No.: 12/201,031

(22) Filed: Aug. 29, 2008

(65) Prior Publication Data

US 2009/0056959 A1 Mar. 5, 2009

(30) Foreign Application Priority Data

Sep. 3, 2007 (CH) ...................................... 1374/07

(51) Int. Cl.
*F24F 13/00* (2006.01)
*A62C 2/06* (2006.01)
*A62C 2/18* (2006.01)

(52) U.S. Cl. ........................ 454/254; 454/257
(58) Field of Classification Search ............. 454/254, 454/255, 1, 50, 60, 70, 80, 369, 257
See application file for complete search history.

(56) References Cited

U.S. PATENT DOCUMENTS

| 899,460 | A | * | 9/1908 | McCloud ........................ 160/227 |
| 1,470,262 | A | * | 10/1923 | Henriksen ..................... 454/273 |
| 1,747,587 | A | * | 2/1930 | Ledwinka ........................ 49/351 |
| 1,778,070 | A | * | 10/1930 | Fisk ............................. 138/94.3 |
| 3,460,457 | A | * | 8/1969 | Frederick et al. ............. 454/369 |
| 4,338,960 | A | * | 7/1982 | Ashdown ....................... 137/240 |
| 4,474,205 | A | * | 10/1984 | Dreyer et al. ............. 137/315.31 |
| 4,493,311 | A | * | 1/1985 | Bachmann ................ 126/285 A |
| 4,582,296 | A | * | 4/1986 | Bachmann ..................... 251/326 |
| 4,666,270 | A | * | 5/1987 | Hager ............................ 251/326 |
| 4,724,863 | A | * | 2/1988 | Connor ......................... 137/240 |
| 4,783,048 | A | * | 11/1988 | St. Clair ..................... 251/129.11 |
| 4,905,662 | A | * | 3/1990 | Bachmann ................. 126/285 A |
| 5,222,541 | A | * | 6/1993 | Hornberger .................... 160/265 |
| 5,351,631 | A | * | 10/1994 | Hill et al. .................... 110/182.5 |
| 5,393,263 | A | * | 2/1995 | McCabe ........................ 454/257 |
| 5,642,767 | A | * | 7/1997 | Nair ................................... 160/8 |
| 5,957,772 | A | * | 9/1999 | Rutkowski et al. ........... 454/257 |
| 6,099,406 | A | * | 8/2000 | Demster ....................... 454/236 |

FOREIGN PATENT DOCUMENTS

| DE | 27 26 307 | 12/1978 |
| DE | 27 26 307 | 12/1978 |
| DE | 295 20 089 | 2/1996 |

OTHER PUBLICATIONS

International Search Report dated Mar. 20, 2008 in Swiss Patent Application CH 1374/2007 (4 pages).

* cited by examiner

*Primary Examiner* — Steven B McAllister
*Assistant Examiner* — Frances H Kamps
(74) *Attorney, Agent, or Firm* — Ostrolenk Faber LLP

(57) ABSTRACT

The invention relates to a protection device for ventilation ducts where at least one duct opening for the supply and/or evacuation of air is provided, in particular for fire protection of air conditioned rooms for information technology installations. To separate the protection zones in the event of an emergency according to high safety standards, it is suggested that said protection device comprises at least one protection slide that is supported in a vertically displaceable manner and furthermore includes a sliding mechanism by means of which said protection slide is movable from an open position to a closed position of said duct opening, said duct opening being completely covered by said protection slide in said closed position.

15 Claims, 4 Drawing Sheets

PRIOR ART

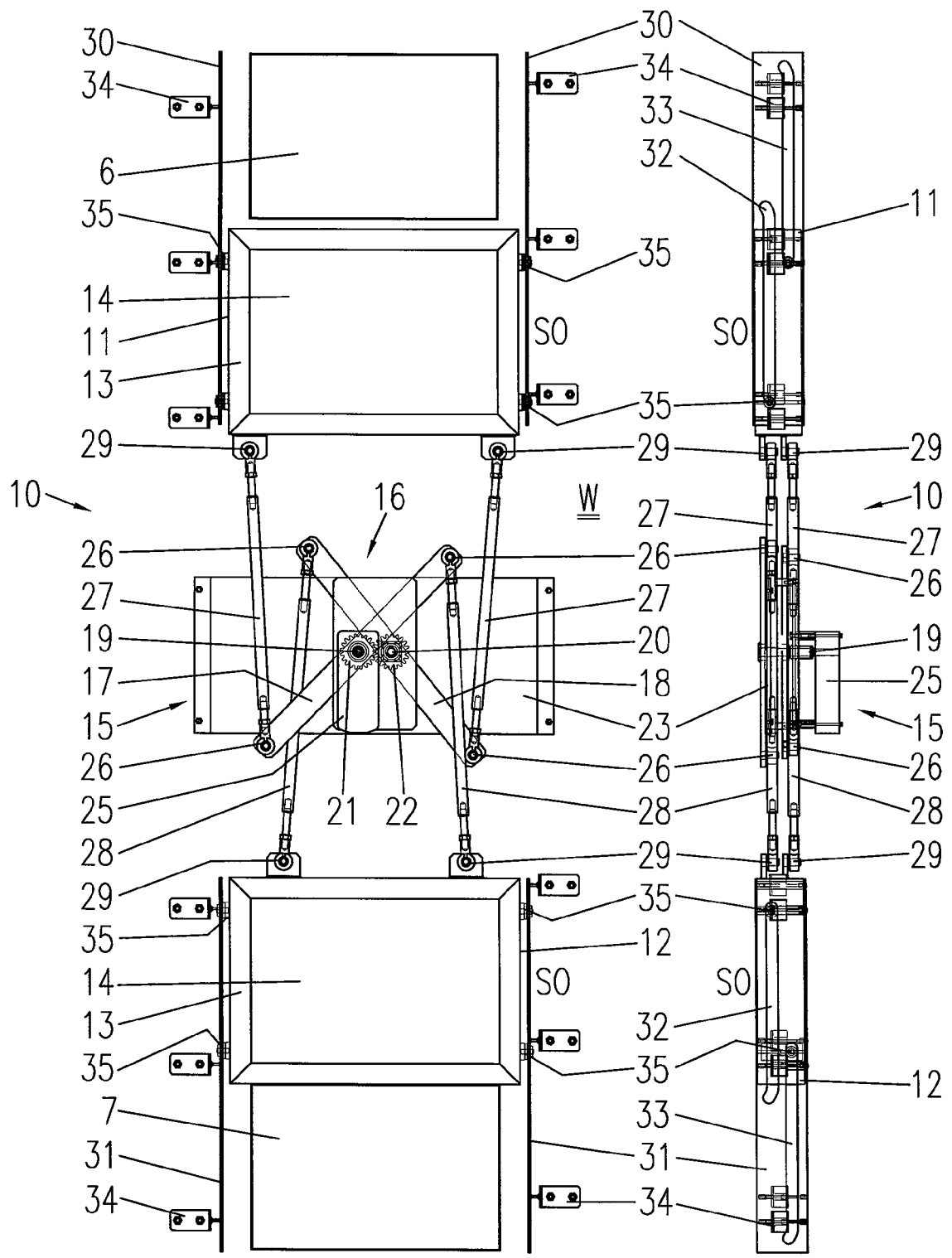

PROTECTION DEVICE FOR VENTILATION DUCTS

FIELD OF THE INVENTION

The invention relates to a protection device for ventilation ducts where at least one duct opening for the supply of air or the evacuation of air or both is provided, in particular for fire protection of air conditioned rooms for information technology installations.

BACKGROUND OF THE INVENTION

Computing centers, distribution centers and other locations for electronic components require ventilation systems that provide conditioned supply air and return air for cooling the components therein. Since such air circulating units represent a high risk of fire and smoke gas impact on the highly sensitive components, their separation from the actual location of the components in an independent fire compartment is common practice. In order to prevent the propagation of fire and smoke into other fire compartments, protection devices are used.

Such protection devices are conventionally equipped with fire dampers operated by spring force which during normal operation of the ventilation system are positioned in the longitudinal direction of the supply air and return air flow paths, respectively, and are rotatable about an axis that is transversal to the flow path such that the air-conducting cross-section can be closed in the event of fire. The operation of such a fire damper in normal operation and in the event of fire is schematically shown in FIG. 1 and FIG. 2, respectively.

However, a superior fire separation that corresponds e.g. to a current safety standard according to EN 1047-2 cannot be realized with such protection devices: on the one hand, a minimum thickness of the fire dampers is required. However, the damper thickness is a limiting factor of the ventilation cross-section that is covered in the event of fire as the damper length must be chosen such that a collision with the ventilation duct during the rotation of the fire damper is avoided. Therefore, air tightness cannot be ensured, and due to the remaining leakage flows in the closed position of the fire damper, the fire resistance rating is strongly reduced. On the other hand, the non-covered, heat-conducting metal frame of the ventilation duct also generates an unacceptably high heat transmission between the insulated fire compartments.

SUMMARY OF THE INVENTION

Accordingly, it is an object of the present invention to provide a protection device of the kind mentioned in the introduction that ensures an excellent fire separation between the fire compartments while avoiding at least one of the aforementioned disadvantages.

It is a further object of the invention to ensure high reliability and safety in operation of such a protection device, said device comprising in particular comparatively high mechanical weight loads.

A protection device according to the invention comprises at least one protection slide that is supported in a vertically displaceable manner and a sliding mechanism by means of which said protection slide is movable from an open position to a closed position of said duct opening, said duct opening being completely covered by said protection slide in said closed position.

Thus, according to the invention, a vertically displaceable protection slide is suggested that allows completely covering the air-conducting cross-section of the duct in the event of fire so that a propagation of fire and smoke into an adjoining fire compartment is effectively prevented.

Preferably, such a protection slide has a highly fire insulating material composition that is possibly enclosed in a stainless steel frame. This in turn implies a high weight load that must be overcome during the vertical movement of the protection slide to its closed position. Conventional actuating devices for use in protection devices are incapable thereof.

To solve this technical problem, according to the invention, a compensating element for compensating the weight of said protection slide is suggested, the weight of said compensating element corresponding to at least a substantial part of the weight of said protection slide. More specifically, the weight of the compensating element corresponds to at least half the weight of the protection slide or may exceed the weight thereof. In this manner, a weight compensation of the protecting slide is achieved so that only a comparatively small force expenditure is required for its movement to the closed position.

Preferably, an equilibrium of forces acting upon said protection slide and said compensation element is substantially provided, thus allowing easy activation by comparatively low expenditure of activation energy and high functional reliability. This may be achieved by said protection slide and said compensating element having substantially the same weight. Thereby, a lever arrangement is preferably articulated on said protection slide and on said compensating element in such a manner that the weight acting upon said compensating element produces a force acting upon said protection slide in the opposite direction.

More generally, said compensating element and said lever arrangement may be so designed that between said weight and said force acting in the opposite direction upon said protection slide and upon said compensating element, respectively, an equilibrium of forces is substantially obtained.

In a preferred embodiment said compensating element is formed by another protection slide.

Apart from fire protection of air conditioned rooms, a further preferred field of application of the protection device of the invention is fire protection in tunnels or in tunnel constructions or fire and/or radiation protection in nuclear power plants, a substantial part of each protection slide consisting of a radiation-absorbing material.

Further preferred embodiments of the invention are defined in the further dependent claims.

BRIEF DESCRIPTION OF THE DRAWINGS

Hereinafter, the invention is explained in more detail by means of a preferred embodiment and with reference to the drawings in which further characteristics and advantages of the invention will become apparent. It should be understood that the figures, the description and the claims include numerous features in combination that will be contemplated individually and combined in further useful combinations by one skilled in the art. In particular.

FIG. 3 shows a front view of a protection device of the invention using protection slides in an open position;

FIG. 4 shows the protection device of the invention shown in FIG. 3 in a lateral view;

DETAILED DESCRIPTION OF THE INVENTION

Figure 1:
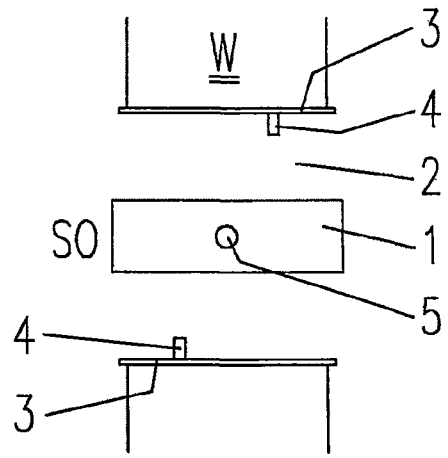
FIG. 1 shows a schematic lateral view of a conventional fire damper in an open position.
Figure 2:
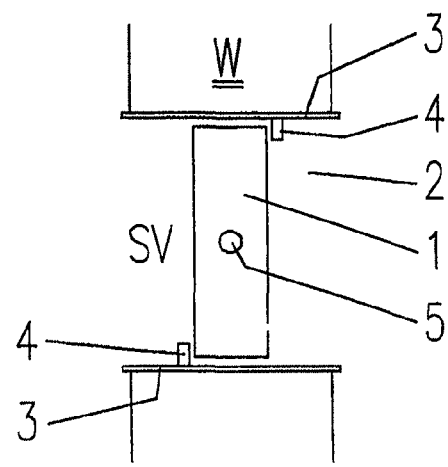
FIG. 2 shows the conventional fire damper of FIG. 1 in a closed position.

FIGS. 1 and 2 schematically illustrate the operation of a conventional fire protection device. The latter comprises a fire damper 1 that is arranged in the interior of an air supply or air evacuation duct 2 in the form of a passage in a wall W. In the junction area of duct 2 and wall W, a metal frame 3 is provided on whose upper and lower sides respective stop members 4 extend into duct 2. Along the center line of fire damper 1 extends a horizontal pivot axis 5 about which fire damper 1 is rotatable.

In the position shown in FIG. 1, fire damper 1 is in an open position SO in which the large damper sides extend in the direction of the wall thickness of wall W. This corresponds to the direction of the passage of the air during normal operation of the ventilation system, so that an air circulation through duct 2 is possible. In the event of fire, fire damper 1 is transferred from open position SO to a closed position SV as it is shown in FIG. 2. By a stop member 4, fire damper 1 is maintained in the closed position SV. In the closed position SV, the large sides of fire damper 1 extend in parallel to the side surfaces of wall W so that a large area of the cross-section of duct 2 is covered by fire damper 1, thereby significantly reducing a possible air exchange through duct 2.

However, in the closed position SV, a total air tightness is not ensured by fire damper 1. For a wall contact of fire damper 1 in closed position SV cannot be realized technically as a collision of the small sides of fire damper 1 with metal frame 3 in the course of the rotation procedure must be avoided in order to reach the closed position SV. Another weak point of such a conventional fire protection device is the heat-conducting metal frame 3 that leads to an unacceptably high heat transfer between the fire source on one side of the wall and the protected area on the other wall side. Another disadvantage is the relatively high force expenditure that is required for closing and opening fire damper 1 while the ventilation system is running.

Figure 5:
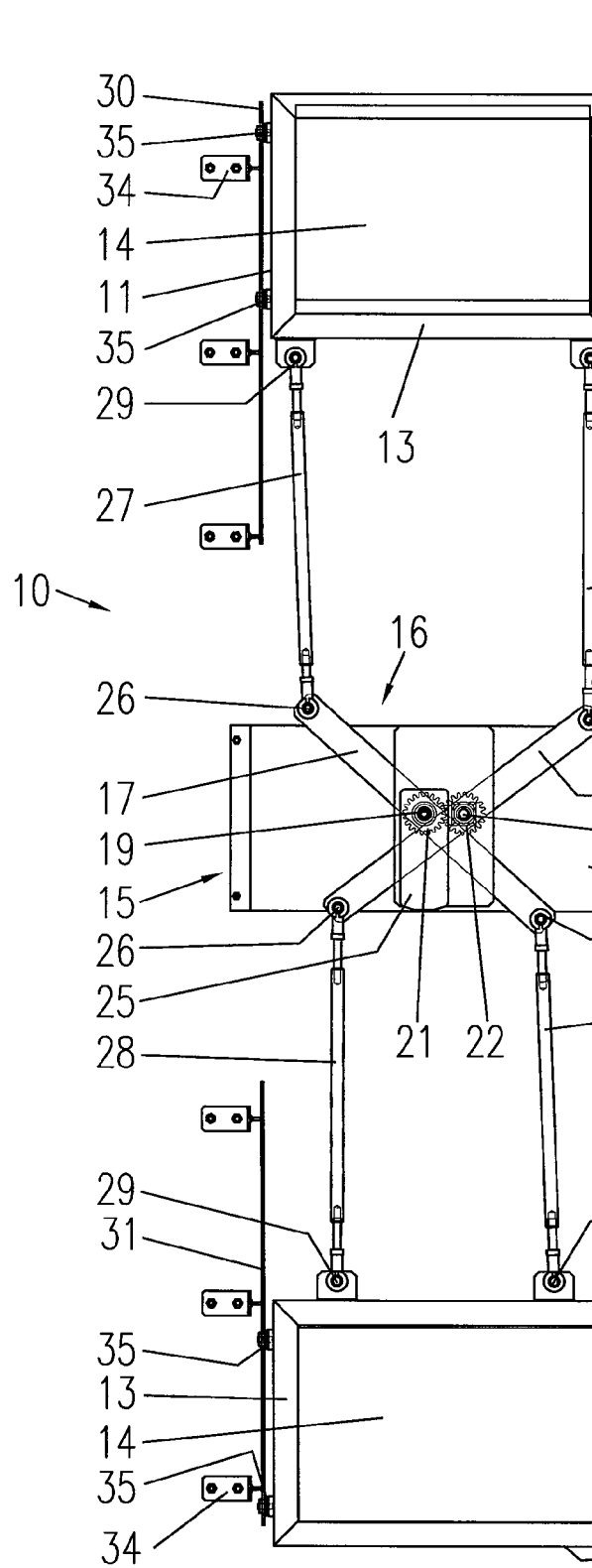
FIG. 5 shows a front view of the protection device of the invention shown in FIGS. 3 and 4 with the protection slides in a closed position.

In FIG. 3 and FIG. 5, a protection device 10 of the invention is shown in a front view in a corresponding open position SO and closed position SV, respectively. Here, wall surface W is provided with a rectangular upper duct opening 6 for the supply of the warm air heated in the outer room and an identically designed lower duct opening 7 for the evacuation of the cold air produced in the inner room.

Protection device 10 includes upper and lower protection slides 11 and 12 having identically designed, essentially rectangular surfaces. Protection slides 11, 12 are each provided in their edge area with a frame 13 that is made of stainless steel. In each frame 13, an inner layer 14 of a highly insulating fire protection material is enclosed. As a fire protection material, e.g. a cement-bonded silicate fire protection panel may be used in spite of its high specific weight of the order of approx. 400 to 2000 kg/m$^3$. A protection slide of this construction may e.g. have a weight of at least 10 kg or a multiple thereof.

The surface of inner layer 14 of protection slides 11, 12 is essentially congruent with duct openings 6, 7 or extends slightly beyond their lateral edges in order to ensure that duct openings 6, 7 are completely covered in the closed position SV of protection slides 11, 12, as seen in FIG. 5.

In the open position SO shown in FIG. 3, upper protection slide 11 is located below upper duct opening 6 and lower protection slide 12 above lower duct opening 7.

In order to displace protection slides 11, 12 from the open position SO to the closed position SV in the event of fire, a sliding mechanism 15 is arranged in the vertical space between protection slides 11, 12. In the central area of sliding mechanism 15, a lever arrangement 16 is arranged that comprises two levers 17, 18 of identical straight shape. Levers 17, 18 cross each other in an area adjacent to their respective pivots 19, 20.

Pivots 19, 20 are located at the respective centers of the longitudinal extension direction of levers 17, 18. On pivots 19, 20, respective gearwheels 21, 22 are provided which are arranged between levers 17, 18 and a mounting plate 23 on which pivots 19, 20 are mounted. Mounting plate 23 is rigidly connected to wall W. Gearwheels 21, 22 are arranged side by side and mesh with one another so as to cooperate during the pivoting movement of levers 17, 18.

On top of the crossing area of levers 17, 18, another mounting plate 24 is mounted to which an activating unit 25 is fastened. Activating unit 25 acts upon left-hand pivot 19 and is therefore operatively connected via gearwheels 21, 22 to right-hand pivot 20. In this particular case, activating unit 25 is realized in the form of a spring return actuator whose motor is adapted to wind the spring and whose spring return is adapted to transmit a torque of approx. 10 to 20 Nm. In the open position SO of protection slides 11, 12, the spring is in the tensioned condition.

At the ends of levers 17, 18, articulations 26 are provided on which respective connection rods are articulated. The two connection rods 27 serve for the force transmission to upper protection slide 11 and extend from respective articulations 29 arranged on the outside of the protection slide to articulations 26 that in the open position SO are located at the ends of the levers on the lower side. The two connection rods 28 are connected at their lower ends by respective articulations 29 to lower protection slide 12 while their upper ends are articulated on respective lever ends 17, 18 located on the upper side in the open position SO of protection slides 11, 12.

Figure 6:
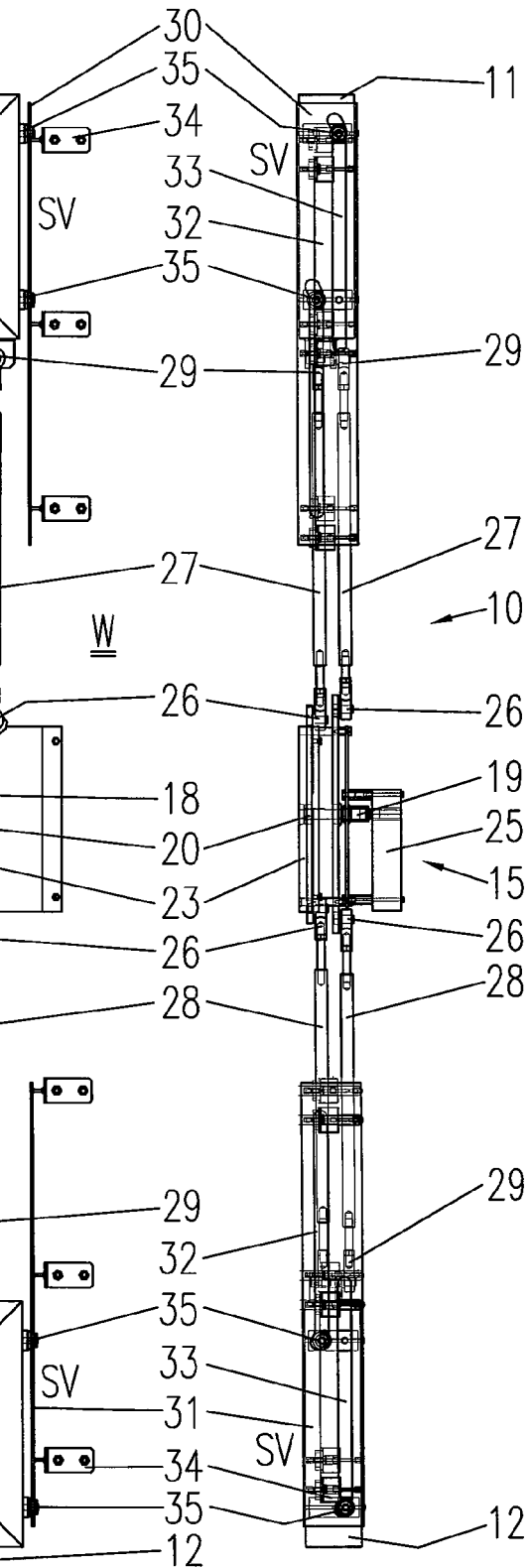
FIG. 6 shows the protection device of the invention shown in FIG. 5 in a lateral view.
Figure 7:
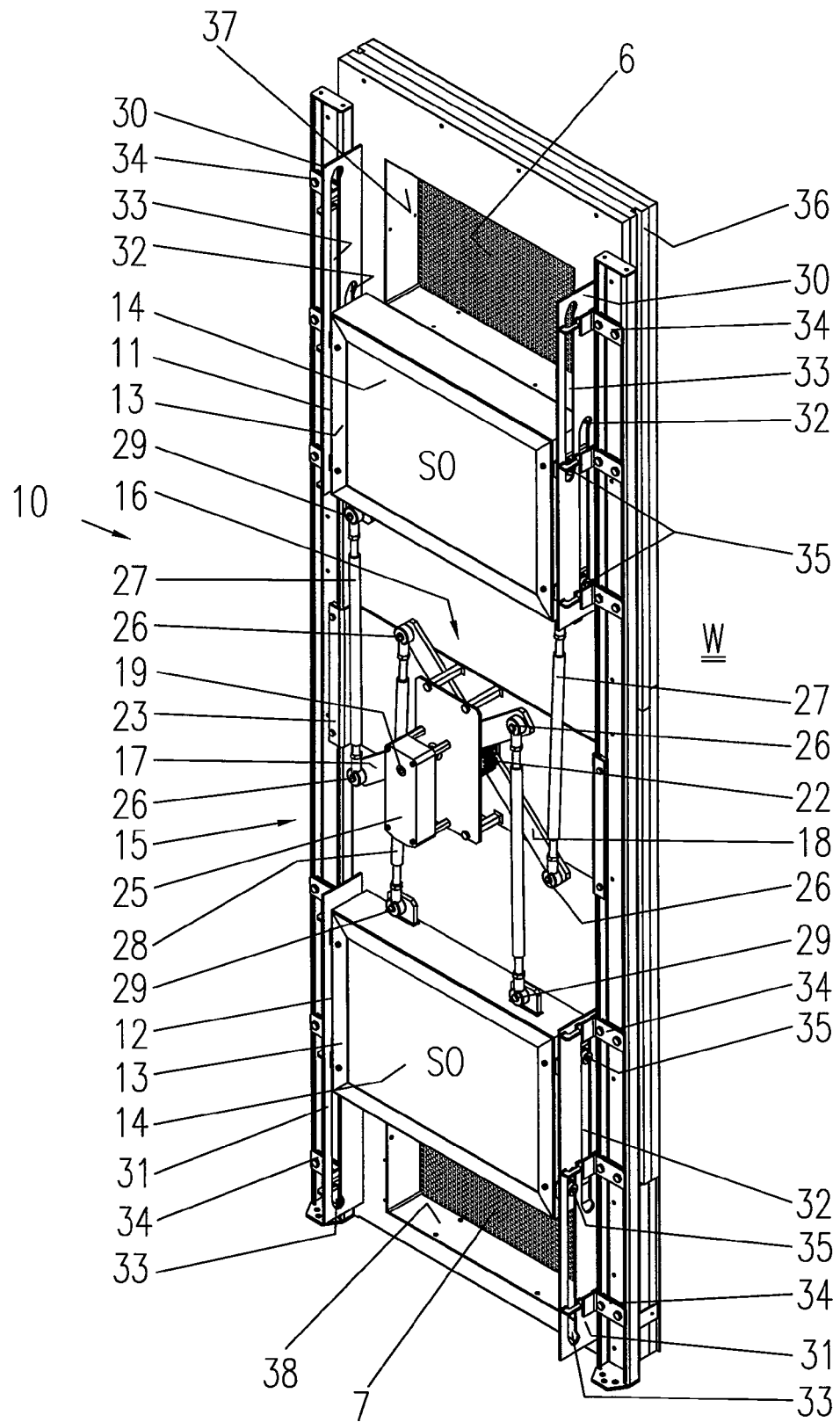
FIG. 7 shows a perspective view of the protection device of the invention shown in FIGS. 3 and 4 with the protection slides in an open position.

In the lateral views of FIG. 4 and FIG. 6 and in the perspective view of FIG. 7, the way of supporting protection slides 11, 12 along wall surface W is seen more clearly. Along the vertical side surfaces of upper protection slide 11 and lower protection slide 12, respective pairs 30, 31 of guide rails are arranged whose total length essentially corresponds to twice the length of the vertical slide sides. In this manner, a vertical movability of protection slides 11, 12 between open position SO and closed position SV is ensured.

In each guide rail of guide rail pairs 30, 31, two elongated apertures are provided which extend essentially parallel in the vertical direction and serve as guide slots 32, 33.

Guide slots 32 on the wall side extend from the sides of guide rail pairs 30, 31 facing away from the respective duct openings 6, 7 up to the center area of the guide rails. Forward guide slots 33 extend from the center area of guide rails 30, 31 up to the opposite ends of the guide rails. Thus, only the center area of the guide rails is traversed by both guide slots 32, 33. The guide rails are screwed to wall W by means of three fastening plates 34.

In the upper and lower end sections of the vertical side surfaces of protection slides 11, 12, respective guide bolts 35 and 36 are provided in the upper and lower protection slides 11 and 12, respectively, which engage in respective guide slots 32, 33. The straight shape of guide slots 32, 33 in upper and lower guide rail pairs 30 and 31, respectively, is slightly slanted in the upper and lower end sections thereof, thereby allowing to move guide bolts 35, 36 toward the wall to closed position SV. In this manner, a frictionless movement of protection slides 11, 12 is ensured as the latter only enter into contact with wall W in the closed position SV.

A protection device 10 of such a construction allows to achieve an excellent fire protection that exceeds conventional safety standards according to EN 1047-2 by far.

Protection device 10 that has been described above is intended for use e.g. in fire protection rooms of air conditioning systems for information technology installations or in tunnel constructions. Another preferred field of application is in fire and/or radiation protection in nuclear power plants. In this case it may be contemplated to form a substantial part of protection slides 11, 12 of a radiation-absorbing material, e.g. a plumbiferous metal mixture that absorbs an ionizing radiation that results in the event of a disaster. In view of the high safety standards that have to be met, no compromises need to be made with regard to the high weight of protection slides 11, 12, so that a high degree of protection against any kind of compromising radiation is guaranteed.

Also, a plurality of protection devices 10 can be arranged side by side along wall surface W in a modular manner. Multiple protection devices 10 can advantageously be juxtaposed as close to each other as desired as only elements arranged in the vertical direction are used which extend beyond the horizontal width of duct openings 6, 7 only little or not at all.

In a preferred embodiment of such a protection wall, for a modular juxtaposition of protection devices 10, a modular wall element 36 is provided between each protection device 10 and wall W as it is illustrated in FIG. 7 in a perspective view. The surface of wall element 36 substantially extends over the entire longitudinal and transversal extension of the associated protection device 10. For its connection to duct openings 6, 7 in wall W, each wall element 36 is provided with apertures 37, 38 of corresponding positions and size. Wall W may e.g. be a concrete wall whereas wall element 36 is preferably made of stainless steel. Alternatively, wall element 36 may comprise any other fire protection material or further include radiation-absorbing materials in the case of an application in nuclear power plants.

Herebelow, the operation of the described protection device 10 is explained in more detail.

During normal operation of the air conditioning system, protection slides 11, 12 are in the open position SO. An optimum air circulation is achieved by supply air ducts 6 arranged in the upper area of the room and exhaust air ducts 7 arranged in the lower area of the room.

In the event of fire in the air conditioning system, protection slides 11 and 12 arranged below and above duct openings 6 and 7, respectively, are movable to the closed position SV. The force required therefor is delivered by activating unit 25, whose spring return motor is switched off due to a thermoelectric signal or due to a power failure so that a torque is applied to pivot 19 by the activated spring return. The result is a pivoting movement of lever arrangement 16 whose vertical movement component is transmitted to protection slides 11, 12 articulated thereon.

In the closed position SV, the fully covered duct openings 6, 7 by protection slides 11, 12 and the high fire insulating effect of the latter ensure an effective fire protection that exceeds customary fire protection measures according to standard EN 1047-2 by far.

By lever arrangement 16 arranged between protection slides 11, 12, the high weight of each protection slide 11, 12 is compensated by the respective other protection slide 11, 12, since the weight of each protection slide 11, 12 produces an opposed force on the respective other protection slide 11, 12. In this manner, each protection slide 11, 12 acts as a compensating element for the other protection slide 11, 12.

The arrangement of the protection slides is completely balanced, i.e. protection slides 11, 12 are essentially in an equilibrium of forces.

Therefore, moving the protection slides to the closed position SV and returning them to the open position SO requires only a small force that can be delivered by a conventional spring return actuator 25. Moreover, the small force expenditure also ensures a high reliability of the activating mechanism, thereby further increasing the fire protection safety.

From the description of the preferred exemplary embodiment, numerous modifications are accessible to one skilled in the art without leaving the protective scope of the invention that is defined by the claims.

Thus, instead of lever arrangement 16 between protection slides 11, 12, a cable assembly may be contemplated by which, due to the weight of one protection slide 11, 12, an opposed force is transmitted to the respective other protection slide 11, 12 in the previously described manner. To ensure the required high functional safety, hard-wearing steel cables may e.g. be used. In this case, sliding mechanism 15 may include a plurality of deflecting pulleys by which the steel cables are guided, thereby transferring protection slides 11, 12 to the closed position SV in the case of an emergency by pulling the steel cables.

Furthermore, the surface of the protection slides need not necessarily correspond to a rectangular shape. Protection slides having a circular or polygonal shape may also be contemplated, e.g. in accordance with the cross-sectional shape of a ventilation pipe. It is merely essential that the ventilation duct is completely covered on the wall side.

Furthermore, the protection device of the invention is also applicable for differently arranged duct openings. Besides a supply air duct that ends in the upper wall section and an exhaust air duct that ends in the lower wall section, duct openings provided near the wall of the protected room in the ceiling or in the floor are possible. These can be completely covered in the described manner by the protection slides that are vertically slidable along the wall.

To achieve a weight compensation, besides an additional protection slide, a counterweight of any kind may be contemplated. With a suitable lever arrangement, the own weight of the compensating element may be relatively low and still serve for compensating a substantial part of the weight of the protection slide.

The invention claimed is:

1. A protection device for ventilation ducts where at least two directly vertically spaced apart duct openings for the supply of air or evacuation of air or both is provided, comprising:

at least one protection slide comprising a sliding damper panel that is supported in a vertically displaceable manner and a sliding mechanism by means of which said protection slide is vertically driven from an open position to a closed position of a first one of said at least two directly vertically spaced apart duct openings, said first one of said at least two directly vertically spaced apart duct openings being completely covered by said protection slide in said closed position; and a compensating element for compensating the weight of said protection slide, a weight of said compensating element having substantially the same weight of said protection slide and said compensating element is constituted by another protection slide, capable of closing a second of the at last two directly vertically spaced apart duct openings wherein when the protection slide covers the first one of said at least two directly vertically spaced apart duct openings, the another protection slide covers the second one of said at least two directly vertically spaced apart duct openings.

2. The protection device of claim 1, wherein said compensating element is so designed that between said weight and said force acting in the opposite direction upon said protection slide and upon said compensating element, respectively, an equilibrium of forces is essentially obtained.

3. A protection device for ventilation ducts where at least two directly vertically spaced apart duct openings for the supply of air or evacuation of air or both is provided, comprising:
  at least one protection slide comprising a sliding damper panel that is supported in a vertically displaceable manner and a sliding mechanism by means of which said protection slide is vertically movable from an open position to a closed position of a first one of said at least two directly vertically spaced apart duct openings, said first one of said at least two directly vertically spaced apart duct openings being completely covered by said protection slide in said closed position; and
  a compensating element for compensating the weight of said protection slide, a weight of said compensating element corresponding to at least a substantial part of a weight of said protection slide and said compensating element is constituted by another protection slide, capable of closing a second of the at last two directly vertically spaced apart duct openings wherein when the protection slide covers the first one of said at least two directly vertically spaced apart duct openings, the another protection slide covers the second one of said at least two directly vertically spaced apart duct openings;
  said sliding mechanism comprises a lever arrangement that is articulated on said protection slide and on said compensating element in such a manner that the weight of said compensating element produces a force acting upon said protection slide in the opposite direction; and
  said lever arrangement comprises at least one lever having a pivot axis that is located between said protection slide and said compensating element, said protection slide having a connecting member that is articulated on one respective lever end and said compensating element having a connecting member that is articulated on the other respective lever end.

4. The protection device of claim 3, wherein said lever arrangement comprises two levers crossing one another.

5. The protection device of claim 4, wherein said levers have respective pivot axes which are provided with gearwheels, said gearwheels meshing with one another and thus cooperating during the pivoting movement of said levers.

6. The protection device of claim 4, wherein said activating unit acts upon at least one pivot axis of said levers.

7. A protection device for ventilation ducts where at least two directly vertically spaced apart duct openings for the supply of air or evacuation of air or both is provided, comprising:
  at least one protection that is supported in a vertically displaceable manner and a sliding mechanism by means of which said protection slide is vertically movable from an open position to a closed position of a first one of said at least two directly vertically spaced apart duct openings, said first one of said at least two directly vertically spaced apart duct openings being completely covered by said protection slide in said closed position;
  a compensating element for compensating the weight of said protection slide, a weight of said compensating element having substantially the same weight of said protection slide and said compensating element is constituted by another protection slide, capable of closing a second of the at last two directly vertically spaced apart duct openings wherein when the protection slide covers the first one of said at least two directly vertically spaced apart duct openings, the another protection slide covers the second one of said at least two directly vertically spaced apart duct openings;
  said sliding mechanism comprises a lever arrangement that is articulated on said protection slide and on said compensating element in such a manner that the weight said compensating element produces a force acting upon said protection slide in the opposite direction;
  said sliding mechanism comprises an activating unit that acts upon said lever arrangement and causes a pivoting movement of said lever arrangement in the event of fire, whereby each respective protection slide and the another protection slide are movable to their respective closed position; and
  said activating unit comprises a spring return actuator.

8. A protection device for ventilation ducts where at least two directly vertically spaced apart duct openings for the supply of air or evacuation of air or both is provided, comprising:
  at least one protection that is supported in a vertically displaceable manner and a sliding mechanism by means of which said protection slide is vertically movable from an open position to a closed position of a first one of said at least two directly vertically spaced apart duct openings, said first one of said at least two directly vertically spaced apart duct openings being completely covered by said protection slide in said closed position;
  a compensating element for compensating the weight of said protection slide, a weight of said compensating element having substantially the same weight of said protection slide and said compensating element is constituted by another protection slide, capable of closing a second of the at last two directly vertically spaced apart duct openings wherein when the protection slide covers the first one of said at least two directly vertically spaced apart duct openings, the another protection slide covers the second one of said at least two directly vertically spaced apart duct openings;
  said sliding mechanism comprises a lever arrangement that is articulated on said protection slide and on said compensating element in such a manner that the weight of said compensating element produces a force acting upon said protection slide in the opposite direction;
  said sliding mechanism comprises an activating unit that acts upon said lever arrangement and causes a pivoting movement of said lever arrangement in the event of fire, whereby each respective protection slide and the another protection slide are movable to their respective closed position; and
  said protection slide is movable from said open position to said closed position and to return said protection slide from said closed position to said open position in such a manner that only a torque of said activating unit of at most 50 Nm is required to move and return said at least one slide.

9. The protection device of claim 1, wherein said sliding mechanism is formed of stainless steel.

10. The protection device of claim 1, further comprising a wall element for a modular arrangement on a wall, said wall element having an aperture that corresponds to said duct opening.

11. The protection device of claim 1, wherein a substantial part of each of said protection slides is made of a highly fire insulating material.

12. The protection device of claim 1, wherein a substantial part of each of said protection slides is made of a radiation-absorbing material.

13. A protection wall comprising at least one protection device of claim 1.

14. The protection wall of claim 13, comprising a modular structure comprised of a plurality of said protection devices.

15. The protection device of claim 3, wherein said lever arrangement is so designed that between said weight and said force acting in the opposite direction upon said protection slide and upon said compensating element, respectively, an equilibrium of forces is essentially obtained.

\* \* \* \* \*